United States Patent Office 3,300,383
Patented Jan. 24, 1967

3,330,383
HIRUDINE FROM LEECHES AND PROCESS FOR RECOVERY THEREOF
Fritz Markwardt and Peter Walsmann, Erfurt, and Gerhardt Schäfer and Horst Töpfer, Radebeul, Germany, assignors to VEB Arzneimittelwerk Dresden, Radebeul, Germany
No Drawing. Filed Oct. 15, 1963, Ser. No. 316,797
4 Claims. (Cl. 167—74)

The present invention relates to a process for preparing hirudine, the substance which is the anti-blood clotting agent present in *Hirudo medicinalis*, the medicinal leech.

It has been known for some time that the leech contains an agent which acts specifically against blood clotting by combining with the clotting enzyme thrombine to a stoichiometrically well-defined practically undissociated complex which offsets the trombine effect.

Many studies of hirudine have been published in articles of the chemical and physiological literature. However, no definite guidelines for practical application have been developed; the findings up to now were exploratory rather than practical. The chemical and physical properties of hirudine remained unknown, since it had not been prepared in a pure state. Not until 1957 was it possible to report about the isolation of hirudine which the inventor achieved at that time clarifying the structure of hirudine, which is a polypeptide of low molecular weight.

A process is known for preparing crude hirudine by extracting the heads of leeches, after their dehydration with absolute ethanol, with a mixture of acetone and water and fractionally precipitating the extract with acetone. The raw product was then treated for purification by electrodialysis, propanol extraction and subsequent electrophoresis with paper. Although that method of preparation leads to hirudine which is electrophoretically uniform, it is not useful for the production of hirudine on a larger scale, the insurmountable difficulty residing in the step of electrophoresis with the elution of hirudine-containing zones previously marked and cut out. It is obvious that in carrying out the process, considerable losses will have to be faced so that the yield in hirudine will not be higher than 25% of the hirudine actually present in the leeches. This is not an economically feasible amount and thus the process does not lend itself to practical application.

Table I hereinbelow illustrates the stages of isolation, specific activity of the individual fractions and losses incurred.

It has been found that the high losses in activity occurring already in the first stage, can be considerably decreased, when the separation of the ballast substances (inactive ingredients) is carried out in a highly diluted extraction solution, whereas the precipitation of crude hirudine is subsequently done in a highly concentrated extraction solution. Thus, it is possible to increase the yield in hirudine to more than 90%.

TABLE I.—PREPARATION OF HIRUDINE AFTER MARKWARDT
(State of the Art)

| Method | Dry Weight | Total Activity, Mio ATU* | Spec. Activity, ATU/mg. | Percent Loss |
|---|---|---|---|---|
| 10,000 Heads of Leeches dehydr. in abs. ethanol and comminuted | 375.0 | 4.875 | 13 | |
| Extraction with 40% acetone fractional precipitation | 4.40 | 3.108 | 700 | 36.1 |
| Electrodialysis Acetone precipitation | 2.39 | 2.868 | 1,200 | 41.0 |
| Extraction with n-propanol lyophilisation | 0.94 | 2.350 | 2,500 | 51.8 |
| Paper electrophoresis lyophilisation | 0.135 | 1.147 | 8,500 | 76.5 |

*Antithrombine Units; Mio stands for million.

It has further been found that it is possible to concentrate to a marked degree the crude hirudine having an activity of about 500 ATU/mg. by repeated re-precipitation with cooled organic solvents preferably alcohol, mixed with water, with simultaneous removal of high molecular inactive byproducts. The specific activity of the intermediate product obtained is at about 1300 ATU/mg., the yield is 90% of the crude hirudine used as starting material.

Moreover, the method of the present invention permits to remove coloring and low molecular inactive impurities tenaciously accompanying hirudine, by adsorbing the said impurities on oxycellulose. Thus, after the said adsorption steps, a product of considerable purity having a specific activity of 4500 ATU/mg. can be obtained by a last purification step by adsorption of the pre-purified hirudine by means of weakly acid cation exchangers basically consisting of artificial resin; for instance, the exchanger known as "Wofatit CP" or "Amberlite IRC–50" may be used with excellent results. These two exchangers are cross-linked styrene acrylic acid copolymers containing carboxylic groups; both are structurally similar. The yield in hirudine is 80% by weight calculated on crude hirudine used at the start.

The process according to the invention therefore makes it possible to recover about 72% by weight of the hirudine contained in a leech, said hirudine having an activity of 4500 ATU/mg.

The steps of the process according to the invention, the specific activities of the intermediate fractions, and the losses can be seen from the following Table II.

TABLE II.—PREPARATION OF HIRUDINE ACCORDING TO THE INVENTION

| Method | Dry Weight | Total Activity, Mio ATU | Spec. Activity, ATU/mg. | Percent Loss |
|---|---|---|---|---|
| 10,000 Heads of Leeches dehydr. in abs. ethanol and comminuted | 380.0 | 5.00 | 13 | |
| Extraction with 40% acetone, precipitation of inactive ingredients, acetone precipitation | 9.00 | 4.50 | 500 | 10 |
| Dissolving crude hirudine fractional ethanol precipitation | 3.12 | 4.05 | 1,300 | 19 |
| Adsorption of pigments on oxycellulose, adsorption of active agent on cation exchanger, elution, lyphiliosation | 0.80 | 3.60 | 4,500 | 28 |

In the following, the invention will be more fully described with reference to a number of examples, but it should be understood that these are given by way of illustration and not of limitation, and that many modifications may be made without departing from the spirit of the invention.

EXAMPLE 1

(a) *Isolation of crude hirudine*

The prepared heads of 10,000 leeches are dehydrated with absolute ethanol, dried and comminuted. They are then extracted once with the tenfold amount of a 40% acetone-water mixture and thereafter with a fivefold amount of such a mixture, the temperature being 40° C., the extraction time 30 minutes each.

For precipitating inactive byproducts, the combined extracts are diluted with half the volume of an 80% acetone-water mixture. Glacial acetic acid is then added in such an amount that the pH will be adjusted to 4.3–4.5. The precipitate which forms is removed by centrifuging, and discarded. The solution which contains the active agent is adjusted to pH 6.0 by the addition of diluted ammonia, and is concentrated in vacuo at the temperature not above 40° C. to 1/10 of the volume of the original extract. To the concentrated extract we add 60% of a 10% trichloro-acetic acid in acetone, whereby the pH value reaches 1.8. From this solution, crude hirudine is precipitated by the addition of 15 times the amount of acetone cooled down to −10° C. (the amount of acetone being calculated on the volume of the concentrated solution) and the precipitate is isolated by centrifugation, and washed with pure ice-cold acetone in the centrifuge glass. The substance obtained is then re-dried in a vacuum exsiccator. The yield in crude hirudine is 9.0 grams. The specific activity is about 500 ATU/milligram (anti-thrombine units).

(b) *Purification of the crude hirudine*

9.0 grams crude hirudine are dissolved in 300 cc. ice-cold distilled water. Then 540 cc. 96% ethanol are added very slowly at a temperature of 0–5° C. The mixture is allowed to stand for 30 minutes at this temperature and subsequently subjected to centrifugation. The supernatant solution contains the main portion of hirudine, the precipitate inactive, high-molecular byproducts which retain about 30% of hirudine by adsorption. For this reason, the precipitate is dissolved in 30 cc. of ice-cold distilled water and, as described above and precipitated by 540 cc. ethanol.

The same procedure is carried out with the precipitate a third time. The then remaining residue is discarded, and the extraction liquids combined with the first filtrate.

For precipitating the active substance the total extract is cooled down to 0–5° C.; we then add very slowly ethanol cooled to −10° C., until a concentration of 85 volume percent is reached. In order to facilitate flocculation of the precipitate, 0.5% of ammonium acetate is added to the ethanol. After the precipitate formed has been allowed to settle, a centrifugation will yield the product which is dried in a vacuum exsiccator after washing with ethanol.

Yield: 3.12 grams hirudine of specific activity 1300 ATU/mg.

(c) *Final purification step*

The 3.12 g. hirudine with the mentioned activity, are dissolved in 900 cc. 0.01 m. ammonium acetate buffer of pH 4.6. Into the solution, we introduce 90 grams finely comminuted oxycellulose (carboxy-content about 12%), and stirring is continued for about 10 hours at room temperature. The solids are then sucked off over a frit and the oxycellulose is washed three times with 650 cc. distilled water. The washing waters are combined with the filtrate.

In order to dissolve the absorbed hirudine from the oxycellulose, the oxycellulose is stirred with 0.05 m. ammonium acetate buffer of pH 4.6, until after an original marked decline of the pH value, the pH of 4.5 is reached. This elution liquid, too, is combined with the filtrate. Into the hirudine-containing solution, 800 cc. Wofatit CP are added in the H form and stirring is continued overnight. During this operation, the pH which originally reached 4.2, decreases to 3.8. After adsorption has taken place (which is determined by checking the supernatant liquid), the resin is sucked over a frit and washed three times using 900 cc. of distilled water each time. The washing water and the filtrate is discarded. The resin is admixed with 450 cc. 1 m. ammonium acetate solution and 5% ammonia is added drop by drop while stirring until the pH will have reached 7.0. A suspension is thus formed which is filtered over frit filter G-4 by suction. The resin is once more suspended in 450 cc. 1 m. ammonium acetate solution and the pH is adjusted to 8.0 by slow dropwise addition of 5% ammonia. Another suction filtration of the resin over a frit filter G-4 is performed and washing is then carried out with distilled water. The elution liquids and the washing waters are combined and concentrated to 400–450 cc. in vacuum at a temperature of 22–30° C.

Thereafter, hirudine is precipitated with the 10 fold amount by volume of 95% ethanol cooled to minus 10° C. with addition of 20 grams ammonium acetate dissolved in a small amount of ethanol. The mixture is allowed to stand for several hours in a freezer and pure hirudine is then obtained by centrifugation. The mass is washed dry in the centrifuge glass with pure, ice cold acetone and dried further in a vacuum exsiccator. Yield: 0.8 gram pure hirudine, spec. activity approximately 4500 ATU/mg.

EXAMPLE 2

The prepared heads of 10,000 leeches are extracted as described in Example 1. For precipitating the crude hirudine, however, we use ethanol, the concentration being the same as indicated in Example 1. The other steps are likewise carried out in accordance with Example 1, except that Amberlite IRC-50 is used as slightly acidic cation exchanger.

What is claimed is:

1. A process for the recovery of hirudine from leeches, which comprises
   a. dehydrating the heads of leeches with absolute ethanol and comminuting the dry heads;
   b. extracting the comminuted heads with acetone and precipitating out the proteinous ballast materials from the extract solution with half the volume of an acetone-water mixture;
   c. acidifying the diluted solution to a pH of approximately 4.5;
   d. discarding the precipitate of inactive byproducts thus formed;
   e. adjusting the pH in the remaining solution to about 6.7 and concentrating the solution to a small fraction of its volume;
   f. adjusting the pH of the concentrate to about 1.5 to 2.5;
   g. Precipitating the active ingredient by increasing the acetone content of the concentrate to at least 80%, by volume, thus recovering a raw product of increased activity;
   h. and recovering from said raw product hirudine in high purity, by repeated precipitation with an organic, water-miscible solvent, subsequent treatment of the last solution with oxycellulose, and adsorption on a weakly acid resinous cation exchanger.

2. The process according to claim 1, wherein the organic solvent used in step h, is ethanol.

3. The process according to claim 1, wherein the oxycellulose treatment in step h is carried out in an ammonium acetate buffer mixture having a pH between 4 and 5.

4. The process according to claim 3, wherein the active ingredient obtained by the oxycellulose treatment is subjected to adsorption on and precipitating out the proteinous ballast materials from the extract solution with half the volume of an acetone-water mixture; and pure hirudine is obtained therefrom by elution with ammonium acetate solution at a pH of 7 to 8, said solution being afterwards concentrated in vacuo, and the purified hirudine obtained therefrom by precipitation with alcohol.

References Cited by the Examiner

Bull. Societe de Chimie Biologique, vol. 45, pp. 55–67, Feb. 20, 1962.

Chemical Abstracts, vol. 55:2122h (1958).

JULIAN S. LEVITT, *Primary Examiner.*

MARTIN J. COHEN, L. RANDALL,
*Assistant Examiners.*